(12) United States Patent  
Lambert et al.

(10) Patent No.: US 9,356,640 B2  
(45) Date of Patent: May 31, 2016

(54) APPARATUS FOR SUPPORTING ONE OR MORE MYRIAD OBJECTS AND METHOD OF USING SAME

(71) Applicant: Wally Products, LLC, Atlanta, GA (US)

(72) Inventors: Richard B. Lambert, Atlanta, GA (US); David A. VanArsdale, Atlanta, GA (US); Carolyn E. VanArsdale, Atlanta, GA (US); Garrett Simmer, Atlanta, GA (US)

(73) Assignee: Wally Products, LLC, Atlanta, GA (US)

( * ) Notice: Subject to any disclaimer, the term of this patent is extended or adjusted under 35 U.S.C. 154(b) by 0 days.

(21) Appl. No.: 14/577,102

(22) Filed: Dec. 19, 2014

(65) Prior Publication Data

US 2015/0180524 A1    Jun. 25, 2015

Related U.S. Application Data

(60) Provisional application No. 61/919,656, filed on Dec. 20, 2013.

(51) Int. Cl.
| | |
|---|---|
| *H04B 1/38* | (2015.01) |
| *H04B 1/3877* | (2015.01) |
| *H04M 1/04* | (2006.01) |

(52) U.S. Cl.
CPC .............. *H04B 1/3877* (2013.01); *H04M 1/04* (2013.01)

(58) Field of Classification Search
CPC ............................... H04B 1/3877; H04M 1/12
USPC .................... 455/575.1, 575.8, 90.3
See application file for complete search history.

(56) References Cited

U.S. PATENT DOCUMENTS

| | | | |
|---|---|---|---|
| 1,666,400 | A | 4/1928 | Rose |
| 1,768,675 | A | 7/1930 | Egan |
| 1,769,719 | A | 7/1930 | Smith |
| 4,817,905 | A | 4/1989 | Rondone |

(Continued)

FOREIGN PATENT DOCUMENTS

| | | |
|---|---|---|
| GB | 2428970 A | 2/2007 |
| GB | 2465989 A | 6/2010 |

OTHER PUBLICATIONS

International Patent Application No. PCT/US2014/071497, Search Report and Written Opinion dated Mar. 20, 2015.
Newest 360 Degree Rotating Leather Stand Case w/ Holder, Cases in the box, Oct. 29, 2013, http://www.casesinthebox.com.

(Continued)

*Primary Examiner* — John J Lee
(74) *Attorney, Agent, or Firm* — Kilpatrick Townsend & Stockton LLP

(57) ABSTRACT

An apparatus for supporting an object includes a top lying on a bottom. Part of the top is attached to the bottom. The unattached part of the top includes a flexible joint such as one or more scored lines immediately next to the attached part of the top. The unattached part of the top is lifted from lying on the bottom to a selectively variable position having an angle of >0° and <180° with respect to the bottom. The bottom may have a stop on its end closest to the unattached part of the top. The object to be supported is placed on the bottom of the apparatus and leaned against the unattached top in its open position. The object is retained from sliding off the bottom by the stop. Thus, the object is supported. The apparatus may be credit card-sized, include a battery charger and/or a data storage device.

15 Claims, 7 Drawing Sheets

(56) References Cited

U.S. PATENT DOCUMENTS

| | | | |
|---|---|---|---|
| 4,932,529 | A | 6/1990 | Levine |
| 5,234,190 | A | 8/1993 | Cross |
| 5,388,798 | A | 2/1995 | Glick |
| 6,527,117 | B2 | 3/2003 | Adkins et al. |
| 7,712,719 | B2 | 5/2010 | Derry |
| 7,861,995 | B2 * | 1/2011 | Liou ............... F16M 11/10 248/454 |
| D639,816 | S | 6/2011 | Bau |
| 8,312,991 | B2 | 11/2012 | Diebel et al. |
| 8,746,638 | B2 | 6/2014 | Carney |
| 2010/0090085 | A1 | 4/2010 | Corrion |
| 2012/0037285 | A1 * | 2/2012 | Diebel ............... A45C 11/00 150/165 |
| 2012/0074271 | A1 | 3/2012 | Goetz |
| 2012/0318950 | A1 | 12/2012 | Wilber |
| 2013/0165188 | A1 | 6/2013 | Carney |

OTHER PUBLICATIONS

Gary NG, ClearShot Is a Handy Credit Card Sized Smartphone Stand, iPhone in Canada, Aug. 11, 2012, retrieved from: http://www.iphoneincanada.ca/accessories/clearshot-is-a-handy-credit-card-sized-smartphone-stand/.

Rick Broida, The Four Best Phone Stands Money Can't Buy, Mar. 22, 2010, retrieved from: http://howto.cnet.com/8301-11310_39-10469907-285/the-four-best-phone-stands-money-cant-buy/.

Janet Cloningeron, A Phone Stand You Can Carry in Your Wallet, Dec. 20, 2011, retrieved from http://the-gadgeteer.com/2011/12/20/a-phone-stand-you-can-carry-in-your-wallet/.

Targus cover and stand for iPad, retrieved from: http://zapp5.staticworld.net/reviews/graphics/products/uploaded/targus_versavu_cover_and_stand_for_ipad_2_939070_g1.jpg; believed to be available as early as Feb. 3, 2014.

Nite Ize, Inc., Mobile Device Stand, Quikstand™, photograph; believed to be available as early as Jan. 18, 2014.

* cited by examiner

APPARATUS FOR SUPPORTING ONE OR MORE MYRIAD OBJECTS AND METHOD OF USING SAME

CROSS-REFERENCE TO RELATED APPLICATION

The present application claims priority to and benefit of the prior filed co-pending and commonly owned provisional application, filed in the United States Patent and Trademark Office on Dec. 20, 2013, assigned Ser. No. 61/919,656, entitled An Apparatus for Supporting One or More Myriad Objects and Method of Using Same, and incorporated herein by reference.

FIELD OF THE INVENTIONS

The invention relates to apparatuses and methods that may support one or more myriad devices, and more particularly only as an example, that may support a wireless device such as a mobile phone, phablet (combination of a smartphone and a tablet), and tablets. The apparatuses and methods of the invention may provide additional or alternative functionality.

BACKGROUND

Communications technology continues to evolve. Presently, a user may carry a wireless device to communicate with others, to read a book or magazine, to watch a video or movie that he or she has downloaded from the Internet, to watch live sporting or other events, to shop online, and/or to carry on other activities.

Conveniently, wireless devices are sized so consumers may take and use them generally wherever they may go. For example, a mother may use her wireless device via video telephony to "attend" a parent-teacher conference with her child's teacher. As another example, an office worker may catch a play-off game on his or her wireless device while having lunch. Yet another example is that of a student who may read his or her textbook on his or her wireless device.

Among the conveniences afforded by current wireless devices is that they may be relatively small and light, and may be readily carried in hand, in a pocket or a purse, or in a case. Yet, this convenience may have its drawbacks. The mother who uses her wireless device to FaceTime™ with her child's teacher, e.g., usually has to hold or prop up her wireless device so the parties are "face-to-face." The office worker who is watching a play-off game on his or her wireless device while having lunch also has to hold or prop up the device so he or she can see the game and eat at the same time. The student reading his or her textbook on his or her device may have to hold or prop up his or her device while reading and while taking notes or otherwise studying with the textbook.

Holding a wireless device while carrying activities such as the video conference, watching the play off game and eating, and studying by reading and taking notes can be tiring and/or awkward. The mother's arm may grow tired of holding the wireless device so she is "face-to-face" with her child's teacher. The office worker may find it awkward to hold the wireless device in one hand so he or she may see the play-off game, yet be able to eat his or her lunch in a socially acceptable manner. A student may hold his or her wireless device to read a textbook, but may have to lay the device down to take notes or face awkward positioning in holding the device and writing at the same time.

So as not to have to hold the wireless device, the user may prop it against an object. Propping the wireless device against an object is only possible, however, when such an object is available and suitable for the purpose. A worker having lunch may prop his or her device against his beverage cup, if he or she has such a cup, but it may not be the right size or provide the right angle of propping, or may be a hazard to the device (such as by being wet). And every time the user desires a sip of his or her beverage, inconveniently, he or she has to un-position the wireless device, hold it, take a drink, and then re-position the device.

Rather than prop his or her device against an object to view the display screen of a wireless device, a user may use a stand specially designed for propping the wireless device. As with simply propping, using a prior art stand has its disadvantages. A first disadvantage is that a wireless device typically does not integrally include a stand to prop the wireless device for convenient viewing of the display screen. A user typically has to acquire a stand to use as a prop as an accessory to the wireless device. In other words, a user may have to spend extra money to purchase a stand. If a stand is unavailable for purchase from the same entity that sold the wireless device, the user may have to go to a different seller, which may be located in a locale different from the seller of the wireless device.

Moreover, in some cases, the user may have to buy a stand that is specially designed to fit his or her wireless device rather than use a "generic" stand. Again, if the seller of the wireless device does not have such a specially designed stand available for purchase, the user may have to find somebody selling the specialized stand, which may include a lot of shopping around.

Another problem with using prior art stands is that a user may forget to carry along his or her stand with his or her wireless device. It may be difficult to remember to bring the stand along with the wireless device, especially if the stand has been separated from the wireless device such as for charging, etc.

A disadvantage to using prior art stands is that it may be difficult to "bring along" a stand for a wireless device when the stand is heavy, shaped strangely, and/or large sized. The office worker may find it easy to slip his or her wireless device into a shirt or slacks pocket when leaving the office for lunch, but may find it difficult to fit a large, heavy stand in the same pocket with the wireless device. The stand may have to be carried separately, which may lead to problems such as losing the stand, having something suitable to carry the stand, readily finding the stand when the user desires to use the wireless device with the stand, and replacing the stand in its carrier when the user is finished with the wireless device.

Another disadvantage to prior art stands for use with a wireless device is that the stands may be complicated to use. A prior art stand may have to be retrieved, unfolded, or undone, and its parts may have to be configured by the user to display the wireless device in an acceptable fashion. The configuration of the prior art stand may take the user some time if such configuration is complicated. The office worker may miss part of his or her play-off game or at least use up part of his or her lunch hour figuring out the configuration of the stand rather than enjoying a break from his or her labors by watching the play-off game.

Accordingly, there is a need by at least some users of wireless devices for an apparatus and/or a method that is more convenient than the prior art to relieve the users of having to hold their respective wireless devices when they are viewing the display screens thereof.

SUMMARY

Stated generally, the invention relates to an apparatus for supporting and/or displaying one or more myriad objects and a method of using same. The invention may be embodied as a credit card-sized apparatus that may be conveniently carried in its closed position in a credit card slot of a wallet or purse or other small space. The invention also may be embodied as smaller or larger than credit card-sized.

More particularly, the invention may include an apparatus having a cover as part of its top that lifts partially away from its bottom. An object may be supported/displayed between the lifted cover and bottom. The supported/displayed object may be anything that may be supported/displayed in such a manner by the apparatus. Particularly, the apparatus may be used to support/display a wireless device such as a mobile or smartphone, eBook reader, phablet (combination of mobile phone and tablet computer), tablet or table computer, and/or the like.

Advantageously, embodiments of the invention allow a user to watch video on a smartphone, read an eBook, or peruse a tablet computer without having to hold the object in his or her hands. The user's hands are free to be used to eat, to write, to knit, and/or to carry on any other action. Further, the user may set up an embodiment of the invention so the user may engage in video conferencing and/or video telephony such as FaceTime™ without having to hold the player in his or her hands. Use of the invention optimally leaves a user's hands free to take notes, make hand gestures, etc.

Another advantage of the invention is that some of the embodiments such as the credit card-sized embodiment may be easily carried by the user with the wireless device in a pocket, purse, or carrier, and may even be carried in a credit card slot of the user's wallet.

The invention also offers the advantage of easy set-up so that a hands-free support/display of wireless device such as an iPhone, iPad, or Kindle may be quickly and effortlessly set up whenever the opportunity presents itself. Yet, the invention may be facilely disassembled by a simple action on the part of the user. Once closed, the invention becomes flat with little thickness so it may be readily stored and carried by the user in a small space, ready to be used.

Embodiments of the invention may be combined work with other devices. For example, an embodiment may be combined with or made as part of a passcard such as employees carry or wear on a lanyard, or that a convention goer may wear to gain admission to events at a convention. An embodiment of the invention may be combined with or made as part of a credit card, or other card such as a debit card, membership card, or the like. Other embodiments of the invention may include convenient features such as a memory storage unit such as a flash drive, or a battery or battery charge for electronic devices.

Embodiments of the invention may bear information, advertising, decoration, and/or the like. An embodiment may have elements of different colors, textures, etc. In an embodiment, a user may mark on the top and/or bottom to personalize the device, decorate it, retain information, etc. The markings on the device may be erasable or removable in some embodiments.

The description of the invention herein provides exemplary embodiments of the invention. For example, as noted above, the invention may be embodied in a credit card-sized apparatus. This invention may, however, be embodied in many different forms and used in a variety of ways other than those mentioned above. Thus, this invention should not be construed as limited to the embodiments set forth herein; rather, these embodiments are provided so that this disclosure is thorough and complete, and fully conveys the scope of the invention to those skilled in the art.

More particularly, an embodiment of the invention may be described as a stand for a device. The stand has a generally rectangular bottom having an upper side. The bottom is substantially flat except for a stopper of a generally rectangular shape disposed along a shorter side of the upper side of the bottom. The stopper has a length substantially the same as the length of the shorter side of the bottom along which the stopper is disposed. The stopper has a width less than its length. The stopper has a thickness at least as thick as the combined thickness of the bottom and a top. The stopper and bottom may be integrally formed.

Also in the embodiment first mentioned in the paragraph above, a first piece of positioning material is disposed on at least a part of the upper side of the bottom of the stand between the stopper and a line on the upper side of the bottom that is underneath and substantially parallel to a fold line on the top. The top of the stand also is substantially rectangular and flat, sized substantially the same as the upper side of the bottom not covered by the stopper, and positioned on top of the upper side of the bottom not covered by the stopper when in a closed position for the top. The top has an upper side and an under side. In this device, the top and the bottom with the stopper may form a substantially flat rectangle when the top is in its closed position, which may be the size of a credit card. Further with regard to this embodiment, a second piece of positioning material is disposed at least on a part of the under side of the top between the short side of the top adjacent to the stopper and a line on the under side of the top underneath and substantially parallel to the fold line on the upper side of the top. The first and second pieces of the positioning material may be of the same material or different in whole or in part.

In the embodiment described in the previous two paragraphs, an under side of the top is connected to the upper side of the bottom between the short side of the top opposite to its short side adjacent to the stopper and the line on the under side of the top underneath and substantially parallel to the fold line on the upper side of the top. The fold line is scored into the upper side of the top with the fold line being generally parallel to and between the short sides of the top so that at least a portion of the unconnected part of the top is selectively moveable away from its closed position atop the bottom to an open position, and so that the portion of the unconnected part of the top bends along the fold line to expose at least a part of the second piece of positioning material on the under side of the top when the top is in its open position. Alternative embodiments may include one or more additional fold lines in the top of that device that are generally spaced slightly apart from the original fold line and parallel to it.

The exemplary device described in the previous three paragraphs may be positioned between the bottom and the unconnected top in its open position by having one part of the device placed on a portion of the first piece of positioning material on the upper side of the bottom, and by having another part of the device placed against a portion of the second piece of positioning material on the under side of the unconnected top in its open position.

Another embodiment of the invention may be described as an apparatus for supporting an object. Besides supporting an object, the apparatus may include a data storage device such as a universal serial bus (USB) flash drive. Specifically, this apparatus includes a bottom having an upper side and a top lying on the upper side of the bottom when the apparatus is closed. The bottom may include a battery charger with a plug (and/or other element) for charging the object with energy if the object is chargeable.

Still referring to the apparatus first described in the previous paragraph, a first portion of the top is attached to the bottom with a second portion of the top being adjacent to the first portion of the top and not attached to the bottom. The second portion of the top has a flexible joint immediately next to the first portion of the top so that the second portion of the top may be lifted from lying on the upper side of the bottom to a selectively variable position having an angle of more than 0 degrees and less than 180 degrees with respect to the bottom. The bottom has a stop on its end closest to the second portion of the top. To use this apparatus, one part of the object may be placed on the bottom, but retained from sliding off the bottom by the stop, and another part of the object may be placed against the second portion of the top when the second portion is in the position of having the angle of more than 0 degrees but less than 180 degrees with respect to the bottom.

In the apparatus described in the previous two paragraphs, the flexible joint may be a scored line in the second unconnected portion of the top on its upper side and near the first connected portion of the top. Other embodiments may include one or more additional scored lines (or features that achieve the same functionality as the scored line). The scored line may allow the second unconnected portion of the top to bend near its connection to the first connected portion of the top. In another embodiment, the flexible joint may include a second scored line in the second unconnected portion of the top on its upper side with the second scored line being adjacent and substantially parallel to the scored line.

Yet another exemplary embodiment may be described more particularly as a device for holding a wireless device in an upright position. The device has a base having a flap on top of the base with one part of the flap being connected to the base. The part of the flap unconnected to the base is selectively moveable to an open position away from the base by the unconnected part of the flap pivoting about the connected part of the flap so the unconnected part of the flap forms an angle of less than 180 degrees and more than 0 degrees with respect to the base. This exemplary device includes at least one score line in the top of the flap near and parallel to the connection of the flap to the base for creating a bend in the flap near its connection to the base. Alternative embodiments may include one or ore additional score lines or feature(s) that serve a similar function. This exemplary device may be used by placing a part of the wireless device on the base and leaning another part of the wireless device against the flap in its open position so that the flap supports the wireless device in the upright position.

Other features and advantages of the inventions may be more clearly understood and appreciated from a review of the following detailed description and by reference to the appended drawings and claims.

DETAILED DESCRIPTION

Figure 1:
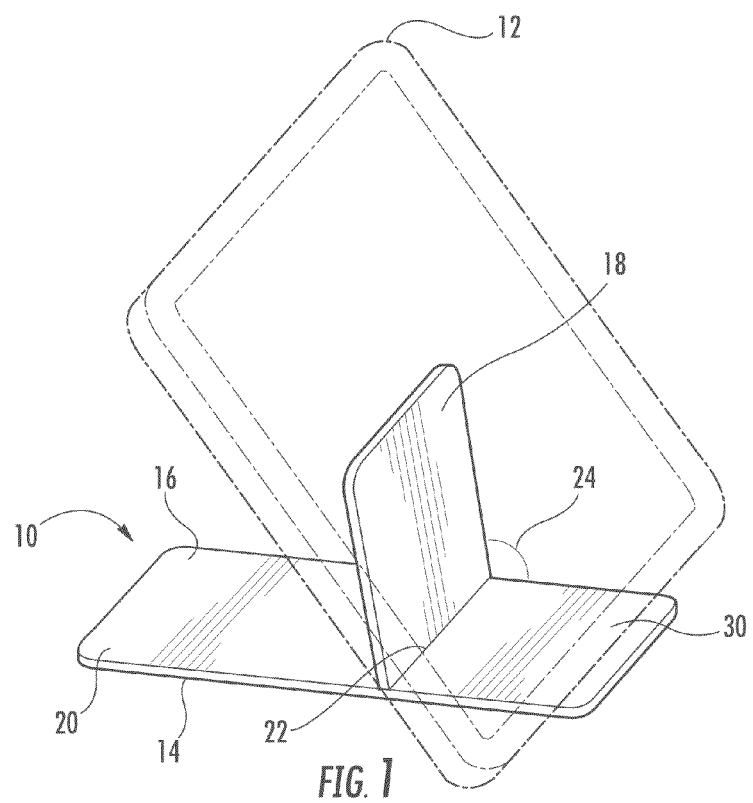
FIG. 1 is a front perspective view of an exemplary embodiment of the invention in use with a wireless device such as a mobile phone.

The invention is described herein with reference to exemplary embodiments, alternative embodiments, and also with reference to the attached drawings. The invention, however, can be embodied in many different forms and carried out in a variety of ways, and should not be construed as limited to the embodiments set forth in this description and/or the drawings. The exemplary embodiments that are described and shown herein are only some of the ways to implement the inventions. Elements and/or actions of the inventions may be assembled, connected, configured, and/or taken in an order different in whole or in part from the descriptions herein.

The invention relates generally to an apparatus for supporting and/or displaying one or more myriad objects and a method of using same. The type, size, and weight of an object that may be supported by the invention may depend generally on the size and strength or support power of the particular embodiment of the invention being used. Examples or embodiments of the invention are provided herein that are credit card-sized (about 3 inches by about 2 inches by about $\frac{1}{8}^{th}$ of an inch). The invention, however, is not to be limited to credit card-sized embodiments. Moreover, the examples of the invention provided herein are generally rectangular in shape with rounded corners. Again, the invention is not to be limited to a rectangular shape with rounded corners. Further, examples of the invention are provided herein that are made of one or more materials including, for example, rigid polyvinyl chloride (rigid PVC or RPVC), flexible polyvinyl chloride (flexible PVC), silicon rubber, polyester (PES), polyethylene terephthalate (PET), polyethylene (PE), high-density polyethylene (HDPE), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), polyurethanes (PU), thermoplastic, steel, aluminum, stainless steel, other plastic or polymer materials, other metallic materials, composite materials, epoxy, resin, wood, or other similar materials. In some embodiments, the invention may be extruded using multiple materials to form multiple layers.

An embodiment of the invention may be referred to herein as a "stand", an "apparatus," a "device," a "display card," a "dock," a "holder," a "rest," a "station," a "support," and/or a "tray."

Objects that may be displayed/supported by exemplary embodiments of the invention include objects that are generally flat and mostly two-dimensional having a relatively small thickness with respect to other dimensions, such as, inter alia, Android phones, art, articles, authorizations, awards, baseball cards, book, cameras, cards, cases, cell phones, ceramics, certificates, coasters, clam shell packaging, compact disks, digital cameras, digital display devices, digital video disk, digital photograph displays, diplomas, disks, displays, display cases, electronic slide show displays, electronic book readers, frames, global positioning system (GPS) devices, greeting cards, iPads, iPhones, iPods, instructions, jewel cases, licenses, magazines, memorabilia, mobile phones, Kindles, mirrors, name plates, navigation units, newspapers, Nokia phones, Nooks, optical disks, packaging, pagers, personal digital assistants, phablets, photographs, pictures, picture frames, portable media (MP) players, postcards, recipes, registrations, sales packaging, Samsung phones, smart phones, stained glass, superphones, tablets, tablet computers, tablet readers, tiles, video cameras, vinyl record albums, wireless units, and works of art such as prints, tiles. Such objects also may be referred to herein as devices or similar terms.

FIG. 1

Figure 3:
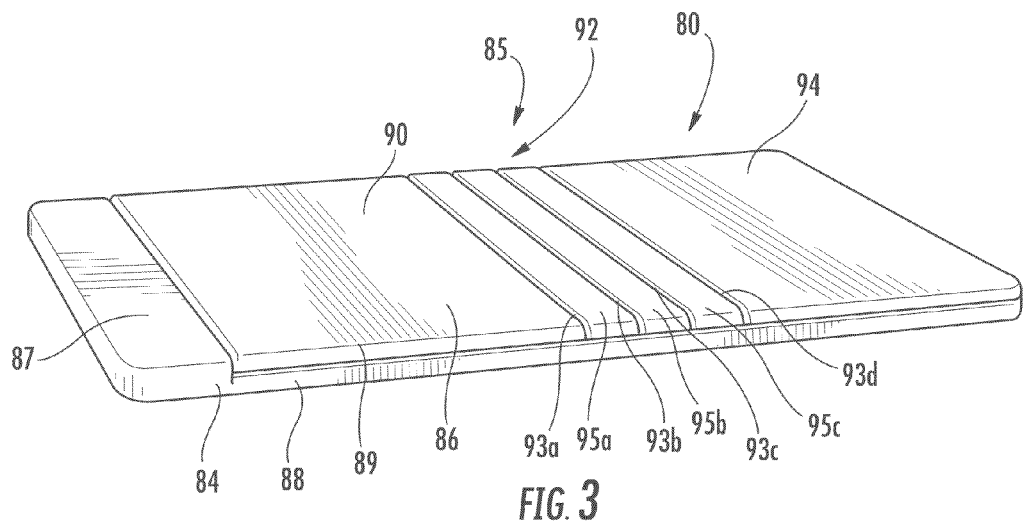
FIG. 3 is side perspective view of an exemplary embodiment of the invention in a closed position.

FIG. 1 illustrates a first embodiment of a stand 10 according to the invention. The stand 10 is shown as supporting a wireless device 12 (in shadow) such as a mobile phone. When the stand 10 is configured to support an object such as the mobile phone 12 and shown in FIG. 1, the stand 10 is referred to as being in an open position. When elements of the stand 10 lie flat against each other, such as when not supporting an object, the stand is referred to as being in its closed position. When the exemplary stand 10 is closed, it resembles a credit card in size and shape in being substantially flat and thin, and having a substantially rectangular shape with rounded corners. FIG. 3 shows an embodiment 80 of the invention in a closed position.

For ease in description herein, the long sides of the exemplary rectangular stand 10 define its length, and the short sides define its width. The same nomenclature is used herein for other rectangular objects.

The exemplary stand 10 of FIG. 1 is made up of two elements of the same general size and shape and thickness: a bottom 14 and a top 16. When the stand 10 is in its closed position, the under side of the top 16 covers, is adjacent to, and in contact with the upper side of the bottom 14 of the stand 10. Even though the exemplary stand 10 is referred to as having two elements 14, 16, these elements may be integrally made.

In the exemplary stand 10, the bottom 14 and the top 16 are made of the same materials. For example, the bottom 14 and the top 16 may each be extruded having one or more layers. In some embodiments, the bottom 14 and the top 16 each have one or more layers of rigid PVC and/or one or more layers of flexible PVC. Many other different materials may be used alone or in combination, such as silicone rubber. In some embodiments, the bottom 14 and the top 16 may include a layer of rigid PVC to provide structural integrity and a second layer of flexible PVC to provide a high friction exterior surface.

As noted, the exemplary stand 10 is of a credit card size. The stand 10 may be made (in whole or in part) of the same material as a credit card. Credit cards are made of polyvinyl chloride acetate (PVCA). Other embodiments of the invention may be made to be the same size as and even to function as pass cards such as security pass cards, swipe pass cards, insert reader pass cards, or proximity reader pass cards. In those cases, the exemplary embodiments may be made (in whole or in part) of the same material as the pass cards.

As another example, the exemplary stand 10 may be made of or covered by material that may be written upon by the user, erasable or not. For example, a user may write his/her name on the stand 10 to identify its ownership.

The top 16 of the exemplary stand 10 has two parts 18, 20 as shown in FIG. 1: a support part 18, and an attached part 20. As the term implies, the support part 18 of the top 16 supports an item or object being displayed when the stand 10 is used for display purposes. Also as the term implies, the attached part 20 of the top 16 is attached to the bottom 14 of the stand 10. The attached part 20 of the top 16 remains attached to the bottom 14 of the stand 10 whether the stand 10 is in an open or closed position.

The two parts 18, 20 of the top 16 are separated by a hinge 22. In the embodiment of FIG. 1, the hinge 22 is a line of weakness or enhanced flexibility (also referred to as a scored line or score) in the material of the top of the top 16. The hinge 22 or the hinge 22 and the surrounding area may be made using a material configured to flex and resist fatigue loads. For example, the hinge 22 (and/or the area surrounding the hinge 22) may be made from flexible PVC. The line of weakness 22 runs generally in parallel to the short sides of the substantially rectangular top 16. In other words, the hinge 22 runs parallel to the width of the exemplary stand 10. The hinge 22 is positioned in this embodiment about ⅖ths of the way along and perpendicular to the length of the stand 10. By having such a position, the hinge 22 defines the support part 18 of the top 16 to be smaller than the attached part 20 of the top 16. In this embodiment, the support part 18 of the top 16 is about 40% of the top. Particularly, the support part 18 of the top 16 is shorter in length than the attached part 20 of the top 16. The support part 18 and the attached part 20 have the same width. Other embodiments may vary.

The hinge 22 in the top 16 allows the support part 18 to move from a closed position through variable open positions to the fullest open position of the stand 10. The closed position of the support part 18, as noted above, is parallel to and lying on top of the bottom 14 of the stand 10. To move the stand 10 into an open or supportive position, a user may pull the support part 18 of the top 16 away from the bottom 14 of the stand 10. The user may pull the support part 18 in any manner that accomplishes the lifting of the support part 18 of the top 16 away from the bottom 14. For example, the user may grasp the support part 18 on either of its short sides 26a, 26b and pull up. As another example, the user may use his/her thumb to pull the unattached long side 28 of the support part 18 of the top 16 away from the bottom 14.

When the user pulls the support part 18 away from the bottom 14, the support part 18 pivots on or about the hinge 22. As the user continues to pull on the support part 18, it continues to move away from the bottom 14 in an arc.

More particularly, the inside angle 24 between the bottom part 14 and the support part 18 at the hinge 22 may be used to define the variable open positions of the stand 10. To open the stand, the support part 18 of the top 16 is moved from its closed position having 0 degrees with respect to the bottom 14 to a position having a greater than 0 degree angle. The support part 18 pivots on the hinge 22 so that the support part 18 moves through positions of greater sized angle with respect to the bottom 14 as the open positions of the stand 10 more fully open. The fullest open position of the stand 10 is achieved when the support part 18 is positioned at its largest angle 24 with respect to bottom 14 of the stand 10. The fullest open position of the stand may be defined by the amount the hinge 22 allows the support part 18 to move away from the bottom 14 of the stand 10. As noted, the angle 24 is the inside angle between the support part 18 and the bottom 14 at the hinge 22.

FIG. 1 shows the exemplary stand 10 in an open position of about 90 degrees between the support part 18 and the bottom 14 of the stand 10. In other words, the support part 18 of the top 16 is generally perpendicular to the bottom 14 of the exemplary stand 10 in this illustration. Other embodiments may vary.

When the support part 18 is lifted away from the bottom 14 of the stand 10, part 30 of the bottom 14 is revealed. In this embodiment 10, the revealed bottom part 30 is about the same size and shape as the support part 18 of the top 16.

As noted, FIG. 1 shows the exemplary stand 10 supporting the wireless device 12 (shown in shadow). Particularly, the wireless device 12 is positioned so it leans between the revealed bottom part 30 of the stand 10 and the support part 18 of the top 16 of the stand 10.

More particularly, the wireless device 12 is generally rectangular in shape. If orientation of the wireless device 12 is important (such as for reading a novel or watching a movie), two of the sides of the wireless device 12 are referred to herein as a top opposite a bottom with the other two sides disposed between the top and bottom. The long sides of the wireless device 12 may be the top and bottom respectively, if the wireless device 12 is being viewed in a landscape mode such as shown in FIG. 1. The short sides of the tablet computer 12 may be the top and bottom respectively, if the wireless device 12 is being viewed in portrait mode such as in FIG. 1.

As shown in FIG. 1, a user may use the stand 10 to support a wireless device 12 in portrait mode to read or watch a movie or other activity. To do so, the user lifts the support part 18 of the top 16 of the exemplary stand 10 away from the bottom 14 of the stand 10 to reveal the bottom part 30 of the stand 10. While holding the support part 18 of the stand 10, the user may position part of the bottom of the wireless device 12 on the revealed bottom part 30 of the stand 10. In this example, the bottom of the wireless device 12 is centered on the revealed bottom part 30 of the stand 10, but it does not have to be. Other configurations are possible. Also in this example, the bottom of the wireless device 12 is placed relatively close to the outside width (parallel to the hinge 22) of the revealed bottom part 30 of the stand 10. Other configurations may vary such as, for example, if the user desired the wireless device 12 have a more vertical position with respect to the stand 10.

Continued positioning of the wireless device 12 on the exemplary stand 10 is now described. After positioning the bottom of the wireless device 12 on the revealed bottom part 30 of the stand 10, the user may position the top of the wireless device 12 with respect to the supporting part 18 of the top 16 of the stand 10. To do so, the user continues to hold the support part 18 of the top 16 of the stand 10 away from the bottom 14 of the stand 10. Meanwhile, the user allows the top of the wireless device 12 to move in an arc towards the support part 18 of the top 16 of the stand 10. In effect, the top of the tablet computer 12 pivots about the bottom of the tablet computer 12 towards the support part 18 of the top 16 of the stand 10. When the top of the wireless device 12 meets the support part 18 of the stand 10, the user may release both the support part 18 of the stand 10 and the wireless device 12. The wireless device 12 leans against and is supported by the support part 18 of the top 16 of the stand 10. In the exemplary embodiment shown in FIG. 1, that part of the wireless device 12 leaning between the revealed bottom part 30 of the stand 10 and the support part 10 comprises the hypotenuse of a right triangle formed by the elements 12, 18, 30. As noted, in FIG. 1, the angle between the revealed bottom part 30 and the support part 18 of the top 16 is about 90 degrees.

FIG. 1 also shows that the wireless device 12 is positioned with respect to the exemplary stand 10 so that the support part 18 of the stand 10 touches slightly above the center back of the wireless device 12. Other configurations may vary depending on a variety of factors including, inter alia, the angle between the support part 18 of the stand 10 and the bottom 14 of the stand 10, the weight, size, shape, and other characteristics of the object displayed/supported, the position of the bottom of the object displayed/supported with respect to the revealed bottom 30 of the stand 10.

To remove the wireless device 12 from the exemplary stand 10, the user may simply reverse the process of positioning the wireless device 12 on the stand 10. The user may move the top of the wireless device 12 away from the stand 10 so that the wireless device 12 disengages from the support part 18 of the top 16 of the stand 10. The user then may lift the wireless device 12 off of the revealed bottom part 30 of the stand 10. As a result, the support part 18 of the top 16 of the stand 10 may return to its closed position atop the revealed bottom part 30 of the stand 10. Other ways of removing the wireless device 12 are possible with this embodiment. Other embodiments may vary in removable of an object from an embodiment of the invention.

FIG. 2

Figure 2:
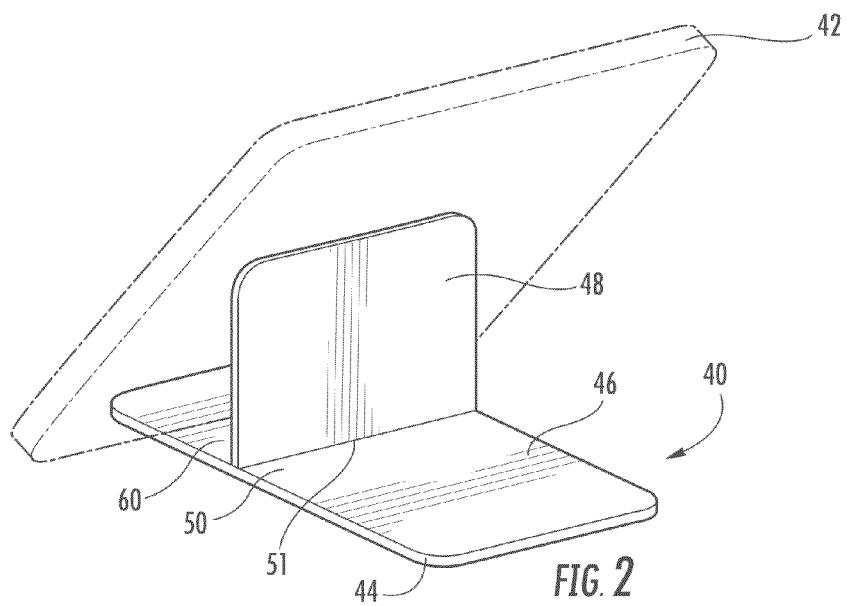
FIG. 2 is a back perspective view of an exemplary embodiment of the invention in use with a wireless device such as a tablet.

FIG. 2 illustrates another embodiment 40 of the invention. Exemplary stand 40 is illustrated as supporting a tablet computer 42 in landscape mode (shown in shadow). Like exemplary stand 10 described in connection with FIG. 1, exemplary stand 40 is generally rectangular with rounded corners, and is made up of two elements of the same general size and shape and thickness: a bottom 44 and a top 46. Again, these elements do not have to be separate, but may be made integrally. When the stand 40 is in its closed position, the top 46 covers the bottom 44 of the stand 40.

The top 46 of the exemplary stand 40 has two parts 48, 50 as shown in FIG. 2: a support part 48, and an attached part 50. The two parts 48, 50 of the top 46 are separated by a hinge 52 defined by a line of weakness (or increased flexibility) 51 in the material of the top 46.

FIG. 2 shows the exemplary stand 40 in an open position of about 90 degrees between the support part 48 and the bottom 44 of the stand 40. When the support part 48 is lifted away from the bottom 44 of the stand 40, part 60 of the bottom 44 is revealed. In this embodiment 40, the revealed bottom part 60 is about the same size and shape as the support part 48 of the top 46.

Figure 4:
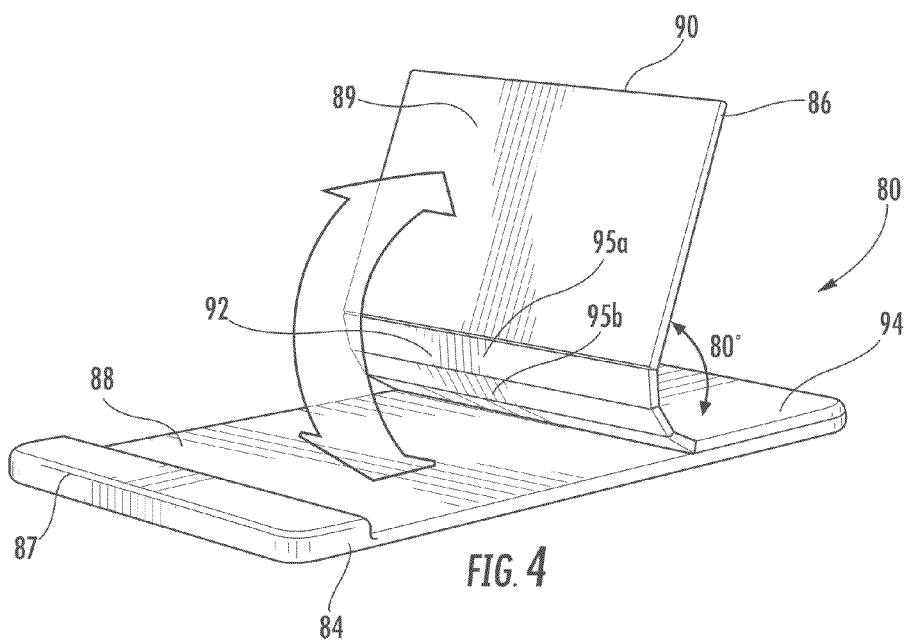
FIG. 4 is a front perspective view of an exemplary embodiment of the invention in an open position.

FIGS. 3 and 4

FIGS. 3 and 4 illustrate another embodiment 80 of the invention. Exemplary stand 80 is shown in FIG. 3 in its closed position and in FIG. 4 in its most open position. Like the previous two embodiments, exemplary stand 80 is credit card-sized, and rectangular in shape with rounded corners. Thus, stand 80 is easily stored in a slot in a wallet or purse, when the stand 80 is not in use. Of course, other embodiments may vary in size, shape, configuration, etc.

Exemplary stand 80 differs from the previous embodiments in having more parts or elements. Like the previous embodiments, stand 80 has a bottom 84, and a top 85 that are about the same size, shape, and thickness. Unlike the previous embodiments, however, the top 85 of stand 80 includes a top element 86 and a stop 87. Stop 87 also may be referred to as a "edge," "ledge," "stopper," or "tab."

In particular, stop 87 is positioned near the "display end" of the stand 80. The "display end" as used herein is the short side of the stand 80 upon which the displayed object rests closest to the surface supporting the stand 80. The stop 87 is as wide as the short side (or width) of the top 85, but the stop 87 is only about 10% as long as the long side (or length) of the top 85. The top element 86 makes up the remaining 90% of the area of the top 85. As is explained below in connection with FIG. 4, the stop 87 is a separate piece from the top element 86 in this embodiment 80. Other embodiments may vary. For example, the bottom, top and stop in an embodiment may be integrally made.

The top element 86 includes a support portion 90, a flexible joint 92, and an attached portion 94. In the exemplary stand 80, the top element 86 is integrally formed (as in being a single piece) to include the support portion 90, the flexible joint 92, and the attached portion 94.

The support portion 90 is the part of the top element 86 that is closest to the display end of the top 85 by the support portion 90 being disposed adjacent to the stop 87 when the stand 80 is closed. Advantageously, the stop 87 and support portion 90 may engage in a snap fit or friction fit so the support portion 90 remains adjacent the bottom 84 ("closed") unless the support portion 90 is removed from its snap fit or friction fit with the stop 87.

The support portion 90 is as wide as the top 86 (and the stop 87), but the support portion 90 is only about 45% as long as the top element 86. As the term implies, the support portion 90 of the top 85 supports an item or object being displayed when the stand 80 is used for display purposes as is more particularly discussed in connection with FIG. 4 below. The support portion 90 is positioned above the bottom 84 of the stand 80 when the stand 80 is closed. When the stand 80 is open, the support portion 90 is moved away from the bottom 84 as is described further below. In other words, the support portion 90 is not fixedly attached to the bottom 84.

Next to the support portion 90 of the top element 86 is the flexible joint 92. It is as wide as the top element 86 (and stop 87 and support portion 90), but is only about 22% as long as the top element 86. Like the support portion 90 of the top element 86, the flexible joint 92 is not attached to the bottom 84 of the stand 80.

In the embodiment of FIG. 3, the flexible joint 92 is an area with four evenly spaced scored lines 93*a-d* in the material of the top 85. The scored lines 93*a-d* run generally parallel to each other and to the short sides of the substantially rectangular top 85. The four scored lines 93*a-d* define three areas 95*a-c* of the flexible joint 92. Each area is the width of the top element 86, but each is only about 7% of the length of the top element 86.

Each scored line 93*a-d* allows the top element 86 to be bent a bit near the scored line. The scored lines 93*a-d* allow the support portion 90 to move from a closed position through variable open positions to the fullest open position of the stand 80. The closed position of the support portion 90, as noted above, is parallel to and lying on top of the bottom 84 of the stand 80. To move the stand 80 into an open or supportive position, a user may pull the support portion 90 of the top element 86 away from the bottom 84 of the stand 80. The user may pull the support portion 90 in any manner that accomplishes the lifting of the support portion 90 of the top element 86 away from the bottom 84 of the stand 80. As the user continues to pull the support portion 90 away from the bottom 84 of the stand 80, each scored line 93*a-d* begins to bend a bit starting with the scored line 93*a* closest to the support portion 90. In moving the stand 80 to an open position, the user may pull part or the entire flexible joint 92 away from the bottom 84 of the stand 80 in addition to the support portion 90 of the top element 86. The cumulative effect of the four scored lines 93*a-d* is to allow a maximum open position of about 80 degrees (inside angle) between the attached portion 94 and the support portion 90 of the top element 86 of the stand 80. Other embodiments may vary. Advantageously, the angle between the support portion 90 and attached portion 94 of the exemplary stand 80 may be made to vary to accommodate different objects, different viewing angles, different orientations of the object, etc.

Still referring to stand 80, next to the flexible joint 92 of the top element 86 is the attached portion 94. It is as wide as the top element 86 (and stop 87, support portion 90, and flexible joint 92) but is only about 33% as long as the top element 86. As the term implies, the attached portion 94 of the top element 86 is attached to the bottom 84 of the stand 80. The attached portion 94 of the top element 86 remains attached to the bottom 84 of the exemplary stand 80 whether the stand 80 is in an open or closed position.

As noted above, the exemplary stand 80 differs from the previous embodiments 10, 40 at least by having more elements. In addition to those already presented in the immediately preceding paragraphs, the exemplary stand 80 includes two layers of liners 88, 89. The liner 88 lies on top of and is attached to that part of the inside of the bottom 84 that is not covered by the stop 87. The other liner 89 lies underneath the top element 86 and is attached to it. Thus, the liners 88, 89 are about the same in size and shape. In addition, the liners 88, 89 are about the same in thickness being relatively thin. Each of the liners 88, 89 may be one piece, or may be separate pieces put together.

Advantageously, the liners 88, 89 are slightly "tacky" and/or have non-slip characteristics. The tackiness and/or non-slick characteristics of the liners 88, 89 may allow for a better grip of the object supported/displayed by the stand 80. Yet, the liners 88, 89 are not so tacky as to interfere with lifting the support portion 90 from the bottom 84 of the stand 80. The tackiness of the liners 88, 89 may better allow for the stand 80 to remain closed when not in use.

Another advantage of the liners 88, 89 is that one or both of them may be decorated. For example, one or both of the liners 88, 89 may be a different color(s) from the remaining elements of the stand, and/or each other. The decoration may be something other than color such as texture, graphics, photographs, symbols, representations, etc. The decoration may include advertising, trademarks, logos, etc. The decoration also may be "more" than ornamentation in conveying information such as use of the stand 80, safety information, thought of the day, praise words, poems, quotes, etc. In an embodiment of the invention, one or both liners 88, 89 may be made of a material upon which a user may make marks that are erasable or not. For example, a user may inadvisably write his/her password on the liners 88, 89.

The exemplary stand 80 is shown in FIG. 4 in its most fully open position. In that position, the support portion 90 of the top element 86 is pulled away from the bottom 84 of the stand 80. When the support portion 90 is pulled away from the bottom 84, the flexible portion 92 allows the support portion 90 to pivot and move in an arc away from the bottom 84. As show in FIG. 4, that part of the flexible portion 92 closest to the support portion 90 of the top element 86 may move away from the bottom 84 as well. In the most fully open position of stand 80 shown in FIG. 4, the inside angle defined between the support portion 90 and the attached portion 94 is about 80 degrees.

The open position of the stand 80 shown in FIG. 4 allows a view of the liners 88, 89. As noted, liner 88 is disposed upon and attached to the inside top of the bottom 84 of the stand 80. Liner 89 is attached to the inside bottom of the top element 86.

FIG. 4 also shows the relationship between the bottom 84 of the stand 80 and the stop 87. As noted above, the stop 87 is disposed on the "display end" of the stand 80 atop the bottom 84. In the exemplary stand 80, the stop 87 and the bottom 84 are integrally formed (of one piece) of the same material.

When the stand 80 is in use, the stop 87 earns its name. A user may open the stand 80 by pulling the support portion 90 away from the bottom 84, and then position the object to be displayed/supported on the back liner 88, but inside of the stop 87. In other words, the stop 87 serves as a ledge or a lip upon which a bottom edge or point of an object may rest in whole or in part. By allowing the object a place to rest, the stop 87 aids in supporting the object on the stand 80. The stop 87 "stops" the object from sliding off the bottom 84 of the stand 80.

Figure 5A:
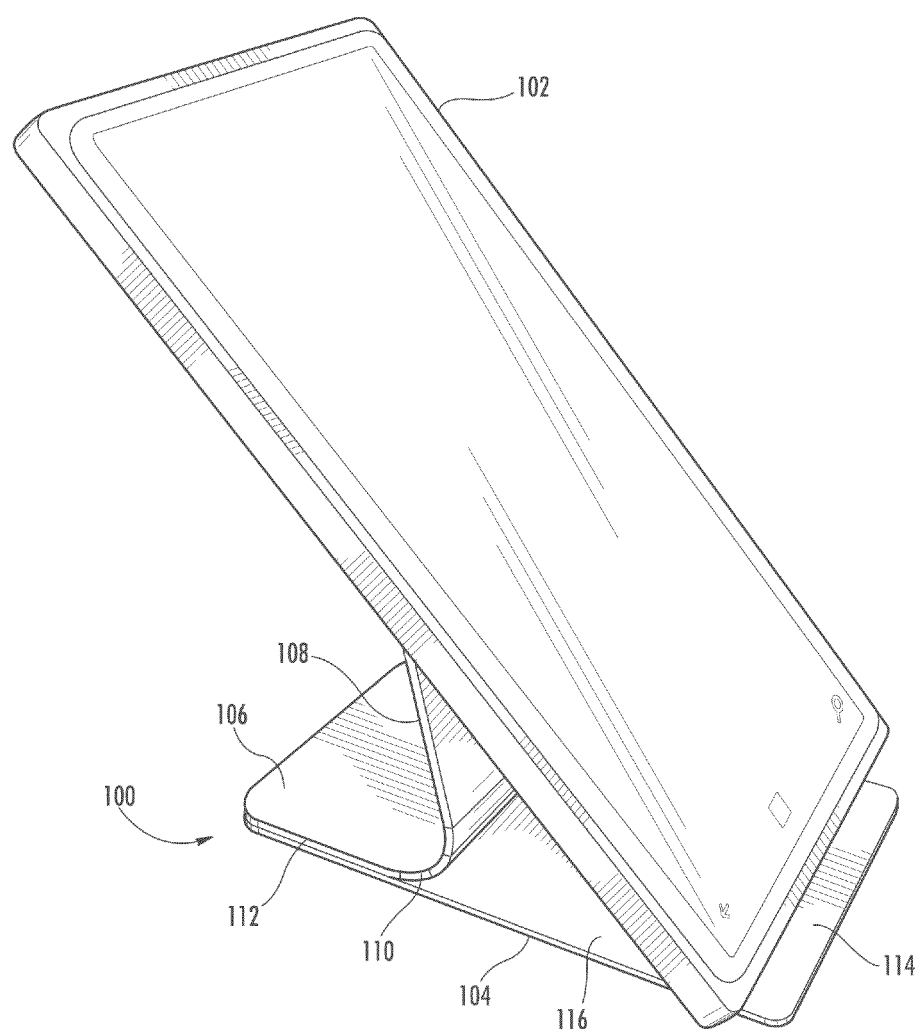
FIG. 5A is a photograph including a front side perspective view of an exemplary embodiment of the invention in use with a mobile device in its vertical position.
Figure 5B:
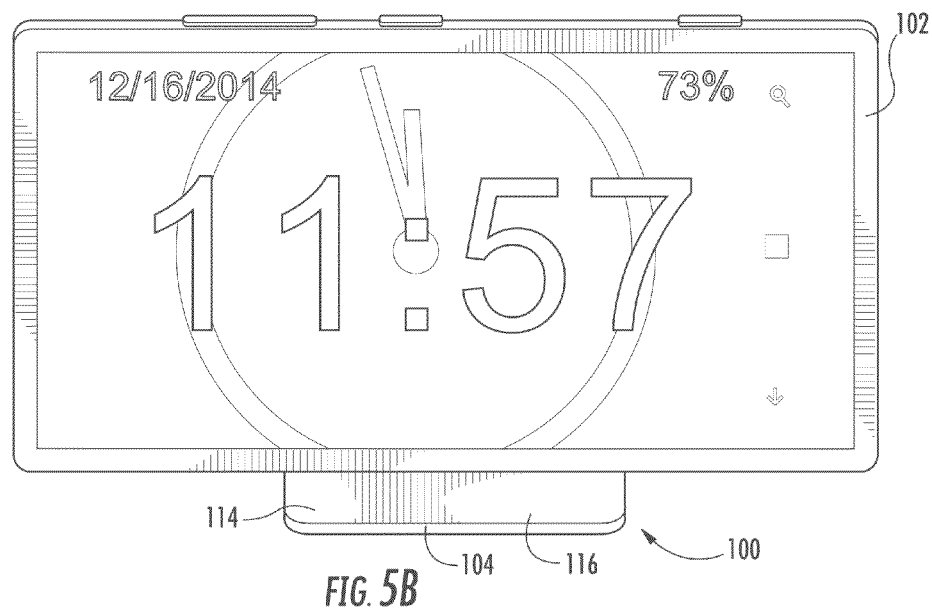
FIG. 5B is a photograph including a front view of an exemplary embodiment of the invention in use with a mobile device in its horizontal position.

FIGS. 5A and 5B

FIGS. 5A and 5B are photographs showing an exemplary stand 100 supporting a wireless device 102. FIG. 5A is a photograph showing a side front perspective view of the exemplary stand 100 in an open position supporting the wireless device 102 in a portrait mode position. FIG. 5B is a photograph showing a front view of the exemplary stand 100 in an open position supporting the wireless device 102 in a landscape mode position.

FIG. 5A shows the bottom side of the wireless device 102 placed on the bottom 104 of the stand 100 while the remainder of the wireless device 102 leans backwards away from its bottom side. The wireless device 102 is supported by the top 106 of the stand 100 in one of its open positions. The top 106 of the stand 100 includes a support portion 108, a flexible joint 110, and an attached portion 112.

Exemplary stand 100 does not include a stop such as stop 87 described above in association with embodiment 80 and FIGS. 3 and 4. In both examples shown in FIGS. 5A and 5B, the bottom of the wireless device 102 is positioned a bit back from the edge of the bottom 104 that corresponds to the "display end" of the stand 100. This is the edge of the bottom 104 that does not have the top attached to it. Thus, there is a small area 114 of the bottom 104 visible in front of the bottom of the wireless device 102.

In the embodiment 100 shown in FIGS. 5A and 5B, the bottom 104 of the stand 100 not attached to the top 106 has a liner 114 such as described above disposed on it. The wireless unit 102 may be better held in place in display position with the use of the liner 114 with the stand 100.

FIG. 6

Figure 6:
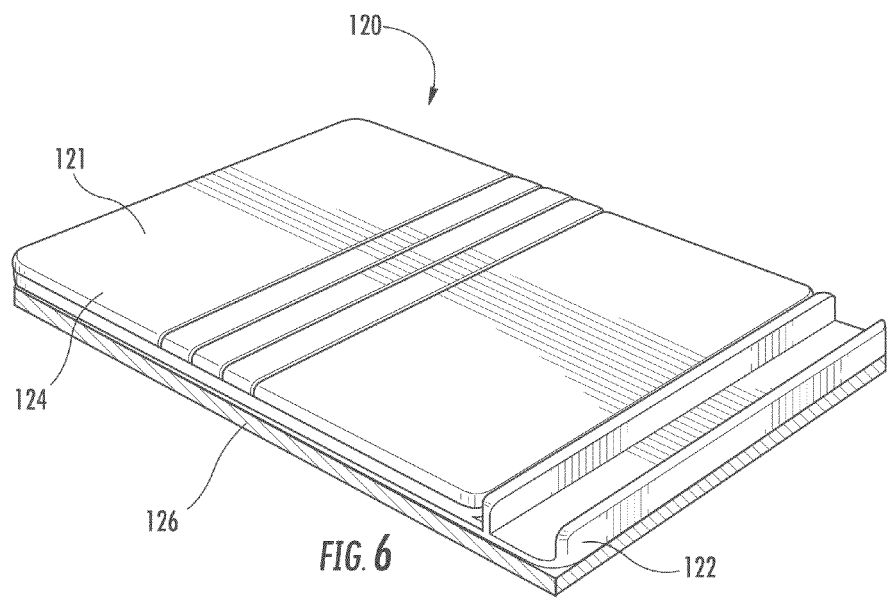
FIG. 6 is a front side perspective view of an exemplary embodiment of the invention in a closed position.

FIG. 6 illustrates another embodiment 120 of the invention. The stand 120 is shown in its closed position. Embodiment 120 is similar to embodiment 80 shown in FIGS. 3 and 4 with a couple of exceptions. Like embodiment 80, the stand 120 includes a stopper 122 disposed on the bottom 124 of the stand 120. The stopper 122 in stand 120, however, is differently configured from the stopper 87 of stand 80. The stopper 122 looks like a "canal" rather than a rectangular box. The stopper 122 has a cross section that is "U" shaped. The canal or U shaped stopper 122 may provide advantages such as reducing the material used in the stand 120 thereby reducing costs of manufacture as well as the overall weight of the stand 120. The canal or U shaped stopper 122 may in some embodiments be used to hold a stylus (and/or other item) for use with the wireless device and/or other object supported by the stand 120. In some embodiments, the stopper 122 include an upstanding lip (see also FIG. 7B).

Another way in which the exemplary stand 120 differs from those previously described is that stand 120 includes a battery charger 126. In this embodiment, the battery charger 126 is an additional element to the stand 120. The battery charger 126 may be (releasably or not) fixed to the under side of the bottom of the stand 120. The battery charger 126 is about the same size in length and width as the bottom of the stand 120. The battery charger 126 is thin and light weight. Other embodiments may vary. For example, a commercially available battery charger may be used with a stand according to the invention. Such a commercially available battery charger may be the Power Card™ sold by Triple C, 47 W. 14$^{th}$ Street, 4$^{th}$ floor, New York, N.Y. 10011. Comparable battery chargers may be used in other embodiments of the invention.

FIG. 6 does not show the plugs and/or other connectors that may be used to connect the battery charger 126 to the displayed object. In some embodiments such plugs and/or connectors may be unnecessary. For example, an exemplary stand according to the invention may be used with a battery charger that is wireless such as those that work on the principle of magnetic resonance. An example of a wireless charging device is the Proxi-2D Resonant Charging Pad available from PowerbyProxi, Ltd., Level 4, 43 College Hill, Freemans Bay, Auckland 1011, New Zealand.

In other embodiments, a battery charger may be included as part of the bottom (and/or other element) of the stand. In other words, the battery charger in these other embodiments may be inside the bottoms of the other stands (and/or other elements of the stands).

As used herein, the term "battery charger" is used because it is presumed that an object to be supported by an exemplary stand may have its own battery. On the other hand, an exemplary stand according to the invention may be provided with a battery for the object to be supported and/or an additional or back up battery for a battery associated with the object to be supported.

Figure 7A:
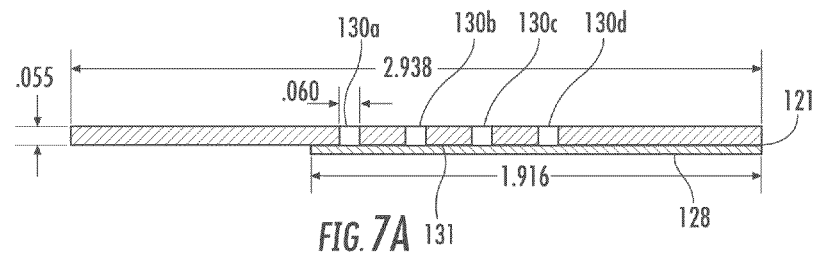
FIG. 7A is a side view of an exemplary embodiment of the invention in a closed position.
Figure 7B:
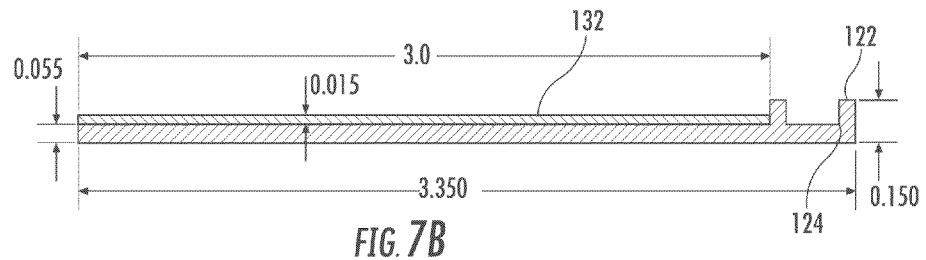
FIG. 7B is a side view of an exemplary embodiment of the invention in a closed position.

FIGS. 7A and 7B

FIGS. 7A and 7B are schematic drawings of cross sections of the top 121 and the bottom 124 of the exemplary stand 120 first discussed in connection with FIG. 6, but without the battery charger 126.

FIG. 7A shows the length of the top 121 to be 2.933 inches. The thickness of the top 121 is 0.055 inches. The top 121 includes a liner 128 of 1.916 inches disposed on that part of the under side of the top 121 that is not connected to the bottom. Other embodiments may have a liner 131 that runs the length and width of the top. The top 121 also include four score marks 130a, 130b, 130c, and 130d. These marks are each 0.080 inches wide. They are spaced apart from each other by a bit longer distance than the 0.080 inches of their width. The marks 130a, 130b, 130c, and 130d are disposed in this embodiment about the middle of the top 121 of the stand 120.

FIG. 7B shows the length of the bottom 122 to be 3.350 inches including the stopper 124 and 3.000 inches without the stopper 124. The thickness of the bottom 122 is the same as the top 121 at 0.055 inches. The height of the walls of the stopper 124 is 0.150 inches. The bottom of the "U" in the canal shaped stopper 122 has a thickness that is the same as the thickness of the bottom without the canal or 0.055 inches. The bottom 124 includes a liner 132 that is positioned on top of the bottom 124 on that part of the bottom 124 that is not connected to the top 121.

Figure 8:
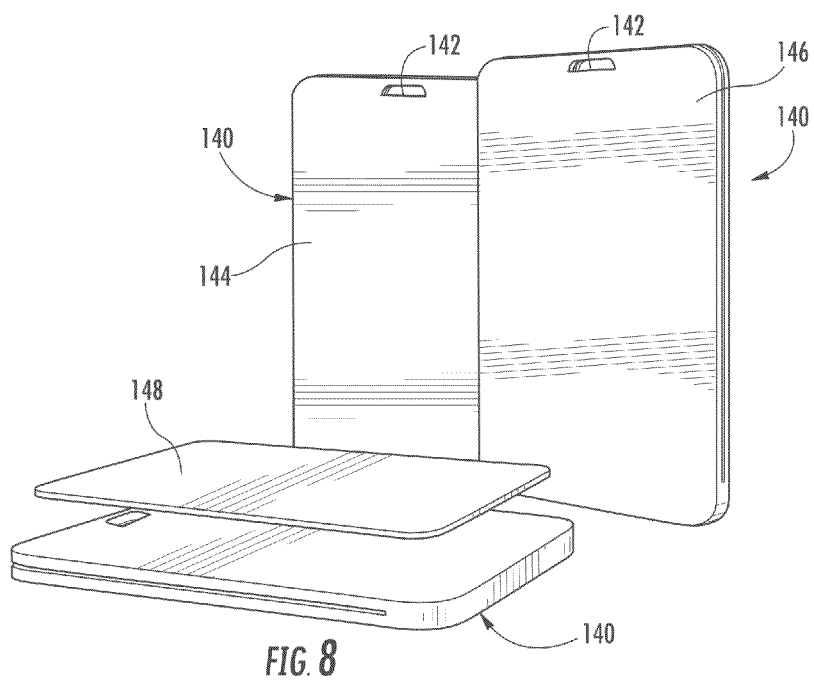
FIG. 8 depicts an exemplary embodiment of the invention in use with a badge.

Exemplary Pass Card Embodiment—FIG. 8

The embodiments of the invention described above may be used generally as stand-alone devices whose function is singular in displaying/supporting objects as described above (except for the embodiments described as used with a battery and/or battery charger). Alternate embodiments of the invention, however, may have one or more additional functions than just that of displaying/supporting objects.

FIG. 8 provides three views of apparatus 140 in an embodiment of the invention that includes the functionality of a stand according to the invention used with or as a pass card. The term "pass card" is used herein to also cover other types of cards or badges that may be combined with the stand functionality of the invention, including, but not limited to access control cards, employment identification badges, data, cards, security pass cards, and the like. Such pass cards may provide data about the person using the pass card or not.

A pass card often includes an opening on one end so the pass card may be worn on a lanyard or otherwise conveniently worn or carried by a user. In the exemplary apparatus 140, an opening 142 has been provided near one end of the apparatus 140. The opening 142 has been provided as centered close to the end opposite to the end where the apparatus 140 may be opened to serve as a stand for an object. The opening 142 is oblong or a flattened oval with the long axis of the opening 142 generally parallel to the end of the apparatus 140. All (or select) of these characteristics of the opening 142 may be made to vary in other embodiments. Moreover, an alternate embodiment may include no opening, or more than one opening.

FIG. 8 includes embodiments that show the top 144, and bottom 146 of the apparatus 140. The top 144 is marked with the name of the business or event to which the pass card 140 relates. The back 146 of the apparatus 140 is marked with information relating to the user of the apparatus 140. The top 144 and bottom 146, in other embodiments, may be otherwise decorated or have other or additional information provided on them. Alternatively, a user may add the information on the top 144 and/or bottom 146, and such added information may be erasable, removable, or not.

FIG. 8 also shows a comparison between a conventional pass card 148 and the apparatus 140. Both are shown in a substantially horizontal position that allows the viewer to compare the relative thicknesses of the respective devices 140, 148. Apparatus 140 is only slightly thicker than conventional pass card 148. Apparatus 140 may be made (in whole or part) of the same material(s) as is (are) conventionally used in making pass cards.

Advantageously, a user of the apparatus 140 has a device, which functions more than just as a conventional pass card 148. The apparatus 140 may be used to support/display objects in such a way as to allow the user to operate hands-free.

Figure 9A:
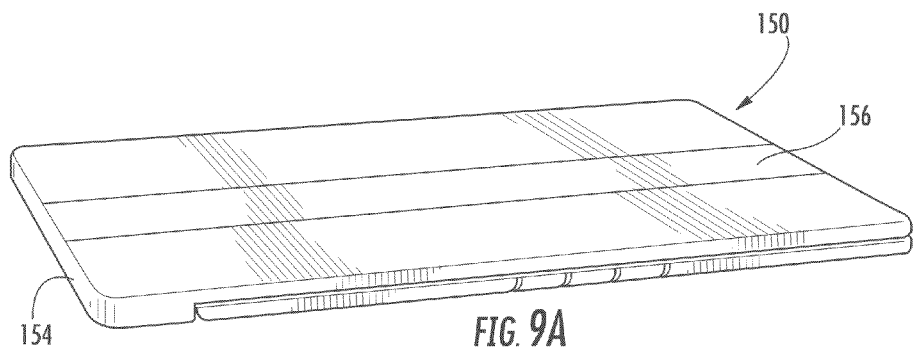
FIG. 9A depicts an exemplary embodiment of the invention in a closed position with decoration.
Figure 9B:
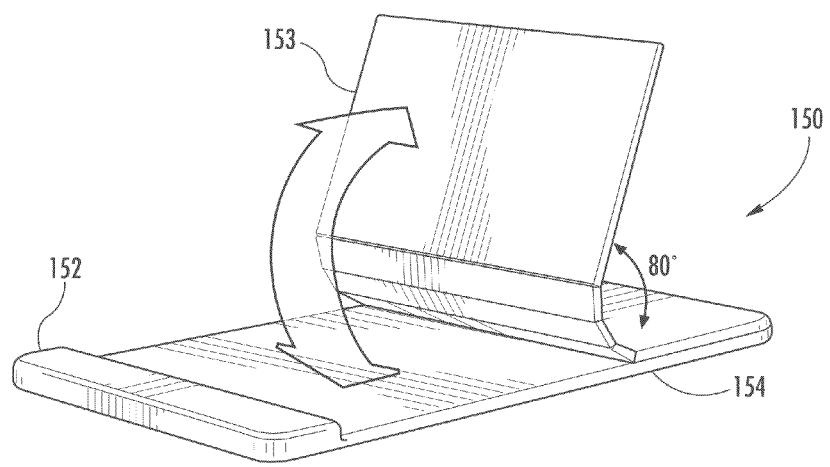
FIG. 9B depicts the exemplary embodiment of FIG. 9A in a closed position.

Exemplary Credit Card Embodiment—FIGS. 9A and 9B

FIGS. 9A and 9B respectively provide two views of an apparatus 150 in an embodiment 150 of the invention that includes the functionality of a credit card. The term "credit card" is used herein to also cover other types of devices that may be combined with the stand functionality of the invention, including, but not limited to debit cards, cash cards, health savings account cards, or the like. The apparatus 150 may be made of the same material as a credit card.

FIG. 9A shows the embodiment 150 showing its "under side" or bottom 154, which functions as a conventional back of a credit card. It includes a magnetic strip 156 (also "stripe") such as may be present on the back of a conventional credit card. The magnetic strip 156 may be made out of a blend of plastic film and tiny magnetized metallic particles. They allow data to be stored and changed right on a credit card. Typically, there are three information tracks on the magnetic strip. The other information generally included on the back of a conventional credit card is not shown in FIG. 9A. Such other information may, however, be included in an embodiment such as apparatus 150.

FIG. 9B illustrates the embodiment 150 in an open position as it may be used to support or display an object, such as is described above in connection with earlier embodiments 10, 80, 90, 120. A portion 153 of the top 152 of embodiment 150 is pulled away from the bottom 154. If the portion 153 is allowed to return to its closed position, the viewer sees the top 152 of the apparatus 150 includes the information (not shown in FIG. 9B) that is typically included on the "front" of credit cards. For example, the top 152 of apparatus 150 may include the user's name, credit card number, expiration date, security holograph, etc.

The invention also may be embodied in an apparatus (not shown in FIGS. 9A and 9B) that may include the functionality of a "contactless credit card". The apparatus may include a radio frequency identification chip (RFID), which can be scanned from a distance. The apparatus may exchange credit card information with a reader via radio waves.

Advantageously, a user of the apparatus 150 has a device, which functions more than just as a conventional credit card. The apparatus 150 may be used to support/display objects in such a way as to allow the user to operate hands-free.

Figure 10:
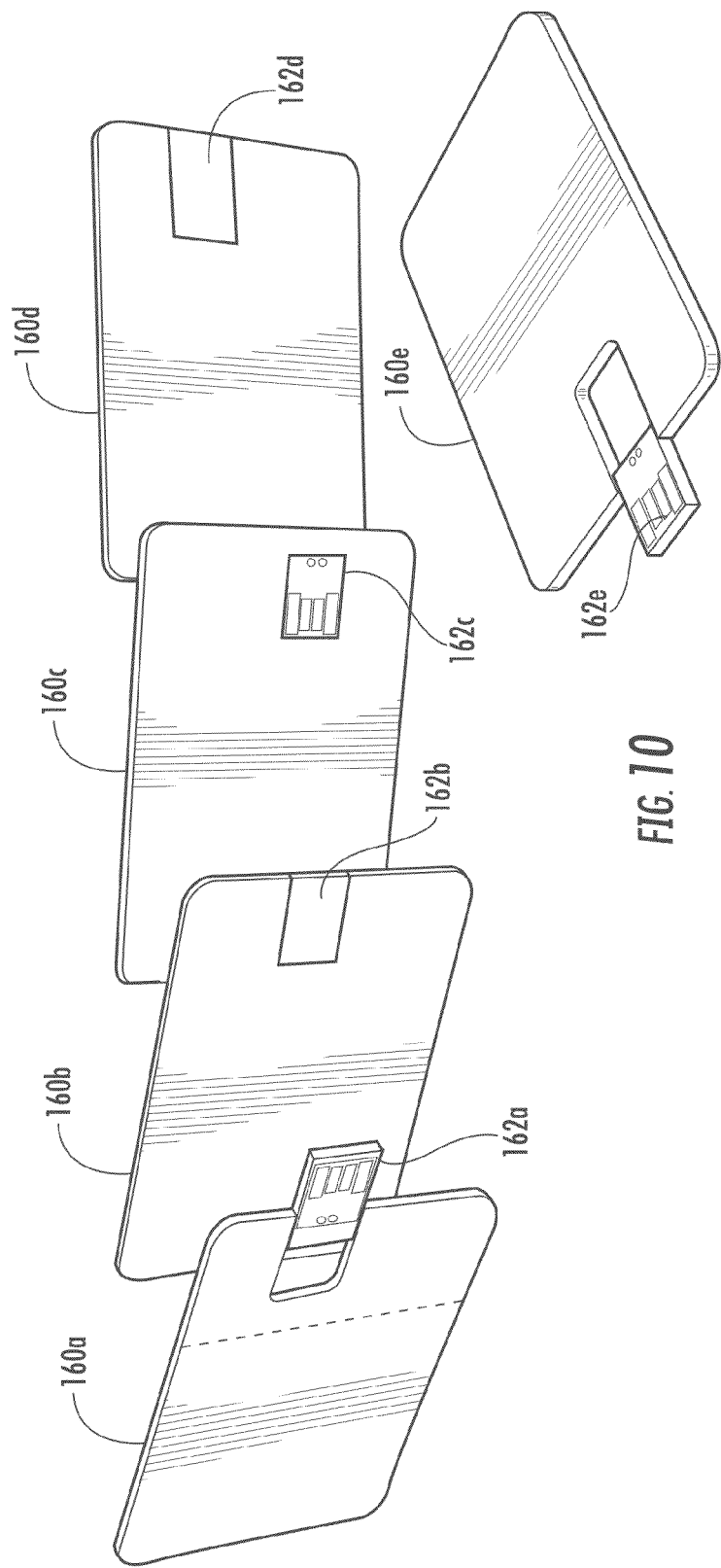
FIG. 10 depicts exemplary embodiments of the invention.

Flash Drive Embodiment—FIG. 10

The invention may be used with or include a flash drive. FIG. 10 provides five examples 160a-e of an embodiment of the invention that includes the functionality of a flash drive. The term "flash drive" is used herein to also cover other types of devices that may be combined with the stand functionality of the invention, including, but not limited to jump drive, USB flash drive, or Universal Serial Bus drive. A flash drive is a data storage device that includes flash memory with an integrated universal serial bus (USB) interface. A flash drive generally is removable and rewritable.

Each of the examples 160a-e is shown from its bottom perspective. Also, each of the examples 160a-e includes a flash drive 162a-e, either in an open position 162a,e or in a closed position 162b-d, as compared to the remainder of the examples 162a-e. The flash drives 162a-e are used in their open position.

Particularly, each of the examples 160a-e is configured similarly to one of the embodiments 10, 80, 90, 120 described above. Thus, each example 160a-e is generally credit card-sized and is generally rectangular with rounded corners. Each example 160a-e has two short ends, one of which serves as a base when the example 160a-e is used and the other short end is the top end. When used as a stand for an object, each example 160a-e is stood on its base. A portion of the top (not seen in FIG. 10) of example 160a-e is moved in an arc away from near the base to serve as the supporting part of the example 160a-e (as described previously in connection with embodiments 10, 80, 90, 120).

In the embodiment illustrated by examples 160a-e, a flash drive 162a-e is made to removably fit into each the examples 160a-e from about the center of the base of the example. The flash drives 162a-e in FIG. 10 are all generally rectangular, but are relatively thin (slightly thinner than the thickness of the examples 160a-e). To accommodate the rectangular shape of the flash drive 162a-e, a rectangular opening of just larger size is made in the base of each of the examples 160a-e. In these examples 160a-e, the rectangular openings have long sides that are parallel to the long sides of the examples 160a-e. The flash drives 162a-e may be snap fit into or otherwise retained in the interior of the examples 160a-e. The flash drives 162a-e may be withdrawn for use from their respective openings by a pulling motion by a user's finger(s) or thumb(s) or otherwise. The flash drives 162a-e may be pulled all the way out of the respective examples 160a-e so the flash drives 162a-e are not in contact with the examples 160a-e.

In an alternate example (not illustrated but comparable to examples 160a-e), two bars span vertically the base end of the rectangular opening for the flash drive. The two parallel bars are above/below each other with space between. The two parallel bars are generally parallel with the short sides of the alternate example. The two parallel bars are spaced apart from each other enough (in thickness) so that a flash drive may be passed into the rectangular opening and between the bars. They may provide a guide for insertion of the flash drives.

Another alternative example (not illustrated) may include a feature to halt the complete withdrawal of a flash drive. The feature may halt the withdrawal of a flash drive when enough of the flash drive is removed from the example so the flash drive may be used for its intended purpose. An advantage of using such a feature to prevent complete separation of the flash drive from the example is that the user may be less likely to lose or misplace the flash drive if it is still attached to the example rather than separated from it. The combination of the example with flash drive makes for a larger, less overlooked object than just the flash drive.

To accommodate the length of a flash-drive 162a-e, an example 160a-e may be configured differently from the embodiments 10, 80, 90, 120 in terms of size of the respective top parts of the tops of the examples 160a-e. The top part or top portion is the part of the top of an example 160a-e that is "peeled away" or lifted from the bottom of the example into a supportive position with respect to the bottom so as to support or display an object. The top part of an example 160a-e may be smaller in length as compared to the other embodiments 10, 80, 90, 120 if the examples 160a-e are credit card sized. The top parts are smaller to accommodate the lengths of the respective flash-drives 162a-e. Alternatively, the flash-drives 162a-e may be positioned opposite the bases of the examples 160a-e, i.e., in the top (the short end opposite the base).

As another alternative, an embodiment of an example 160a-e may be configured to be thick enough to accommodate a flash drive, but also have a top part that is as long as in the other embodiments 10, 80, 90, 120 (or proportionally as long as them, if the alternative embodiment is sized otherwise than as a credit card). In this alternative embodiment of an example 160a-e, the opening for the flash drive may be a hollowed out portion of the example 160a-e. In other words, the flash drive may be completely housed inside the alternative example 160a-e, when not in use.

As yet another design change, the opening for the flash drive in the example 160a-e may allow for viewing one side of the flash drive but not the other. The flash drive may be viewed from the bottom of the design-changed embodiment of the example 160a-e, rather than from its top. The top is complete without any opening, and allows for a support portion in the top of whatever size without regard to the flash drive.

Further, in FIG. 10, the examples 160a-e illustrate a feature previously discussed or possible with respect to embodiments 10, 80, 90, 120 of the invention. The examples 160a-e each bears the name of a company. In other words, the examples 160a-e each advertises a company. Thus, advantageously, the examples 160a-e provide three-way functionality: (1) as a stand for an object allowing a user hands-free operation; (2) a housing for a flash drive; and (3) a vehicle for advertising. Other embodiments of the invention may combine functionality of one or more other features and characteristics discussed herein in one or more of many ways.

Miscellaneous

The embodiments above have been described as supporting and/or displaying a single object. These same embodiments may support and/or display more than one object based on the size of the embodiment and the size of the objects. Other embodiments may be limited to supporting/displaying only a single object or may be configured to support/display more than one object.

Color, patterns, ornamentation, texture, and the like may be used to distinguish parts of the invention from other parts. For example, the top 16 of exemplary stand 10 may be a different color from the bottom 14 of the stand 10. The difference in color may serve as an aid in opening the stand 10. For instance, assume the stand 10 is all one color. Given the relative thinness of the stand 10, it may be somewhat more difficult to open if the top and bottom are not readily discernable from each other. Different respective colors may allow a user to readily pull the top from the bottom of the two-color stand.

CONCLUSION

The exemplary embodiments of the invention were chosen and described above in order to explain the principles of the invention and its practical applications so as to enable others skilled in the art to utilize the inventions including various embodiments and various modifications as are suited to the particular uses contemplated. The examples provided herein are not intended as limitations of the present invention. For instance, many examples herein refer to use of the embodiments with a wireless device. Uses with other types of apparatus, devices, items, methods, and/or systems may be appropriate. Other embodiments will suggest themselves to those skilled in the art. Therefore, the scope of the present invention is to be limited only by the claims below.

That which is claimed is:

1. A stand for a device, comprising:
a generally rectangular bottom having an upper side;
the bottom being substantially flat except for a stopper of a generally rectangular shape disposed along a shorter side of the upper side of the bottom;
the stopper having a length substantially the same as the length of the shorter side of the bottom along which the stopper is disposed;
the stopper having a width less than the length;
the stopper having a thickness at least as thick as a combined thickness of the bottom and a top;
a first piece of positioning material disposed on at least a part of the upper side of the bottom between the stopper and a line on the upper side of the bottom that is underneath and substantially parallel to a fold line on the top;
the top being substantially rectangular and flat, sized substantially the same as the upper side of the bottom not covered by the stopper, and positioned on top of the upper side of the bottom not covered by the stopper when in a closed position for the top;
the top having an upper side and an under side;
a second piece of positioning material disposed at least on a part of the under side of the top between a first short side of the top adjacent to the stopper and a line on the under side of the top underneath and substantially parallel to the fold line on the upper side of the top;
the under side of the top being connected to the upper side of the bottom between a second short side of the top opposite to its the first short side and the line on the under side of the top underneath and substantially parallel to the fold line on the upper side of the top;
the fold line being provided in the upper side of the top with the fold line being generally parallel to and between the first and second short sides of the top so that at least a portion of an unconnected part of the top is selectively moveable away from the closed position atop the bottom to an open position, and so that the portion of the unconnected part of the top bends along the fold line to expose at least a part of the second piece of positioning material on the under side of the top when the top is in the open position, whereby the device may be positioned between the bottom and the unconnected part of the top in the open position by having one part of the device placed on a portion of the first piece of positioning material on the upper side of the bottom, and by having another part of the device placed against a portion of the second piece of positioning material on the under side of the unconnected part of the top in the open position.

2. The stand of claim 1, wherein the stopper and the bottom are integrally formed.

3. The stand of claim 1, wherein the top and the bottom with the stopper form a substantially flat rectangle when the top is in the closed position.

4. The stand of claim 3, wherein the substantially flat rectangle formed by the top and the bottom with the stopper is about the size of a credit card.

5. The stand of claim 1, further comprising a second fold line provided in the upper side of the top adjacent and parallel to the fold line and disposed more proximate the first short side of the top than the fold line so that the portion of the unconnected part of the top bends along the fold line and the second fold line to expose the at least a part of the second piece of positioning material on the under side of the top in the open position.

6. The stand of claim 5, further comprising a third fold line provided in the upper side of the top adjacent and parallel to the second fold line and disposed more proximate the first short side of the top than the second fold line so that the portion of the unconnected part of the top bends along the fold line, the second fold line, and the third fold line to expose the at least a part of the second piece of positioning material on the under side of the top in the open position.

7. The stand of claim 6, further comprising a fourth fold line provided in the upper side of the top adjacent and parallel to the third fold line and disposed more proximate the first short side of the top than the third fold line so that the portion of the unconnected part of the top bends along the fold line, the second fold line, the third fold line, and the fourth fold line to expose the at least a part of the second piece of positioning material on the under side of the top in the open position.

8. An apparatus for supporting an object, comprising:
   a bottom having an upper side;
   a top lying on the upper side of the bottom;
   a first portion of the top being connected to the bottom;
   a second portion of the top being adjacent to the first portion of the top and not connected to the bottom; and
   the second portion of the top having a flexible joint adjacent the first portion of the top so that the second portion of the top may be lifted from lying on the upper side of the bottom to a selectively variable position having an angle of more than 0 degrees and less than 180 degrees with respect to the bottom, wherein:
   one part of the object may be placed on the bottom, but retained from sliding off the bottom, and another part of the object may be placed against the second portion of the top when the second portion is in the selectively variable position;
   the flexible joint comprises a fold line in the second portion of the top on an upper side of the second portion and near the first portion of the top;
   the fold line allows the second portion of the top to bend near the first portion of the top; and
   the flexible joint comprises a second fold line in the second portion of the top on the upper side of the second portion with the second fold line being adjacent and substantially parallel to the fold line.

9. The apparatus of claim 8, wherein the bottom comprises a stop on an end closest to the second portion of the top such that the stop is configured to contact a portion of the object and prevent the object from sliding off the bottom.

10. The apparatus of claim 8, wherein the bottom comprises a battery charger with plug for charging the object with energy if the object is chargeable.

11. The apparatus of claim 8, further comprising a data storage device.

12. The apparatus of claim 11, wherein the data storage device comprises a universal serial bus (USB) flash drive.

13. A device for holding a wireless device in an upright position, comprising:
   a base having a flap on top of the base;
   a first part of the flap comprising a connection to the base and a second part of the flap being unconnected to the base;
   the second part of the flap being selectively moveable to an open position away from the base such that the second part of the flap pivots about the first part of the flap so the second part of the flap forms an angle of less than 180 degrees and more than 0 degrees with respect to the base;
   a first fold line in the top of the flap near and parallel to the connection of the flap to the base for creating a bend in the flap near the connection to the base; and
   a second fold line in the top of the flap generally set apart from but parallel to the first fold line and further than the first fold line from the connection of the flap to the base,
   whereby placing a part of the wireless device on the base and leaning another part of the wireless device against the flap in the open position supports the wireless device in the upright position.

14. The device of claim 13, further comprising a third fold line in the top of the flap generally set apart from but parallel to the second fold line and further than the second fold line from the connection of the flap to the base.

15. The device of claim 14, further comprising a fourth fold line in the top of the flap generally set apart from but parallel to the third fold line and further than the third fold line from the connection of the flap to the base base.

* * * * *